A. WARNE.
CUSPIDOR.
APPLICATION FILED FEB. 7, 1913.
1,080,090.
Patented Dec. 2, 1913.
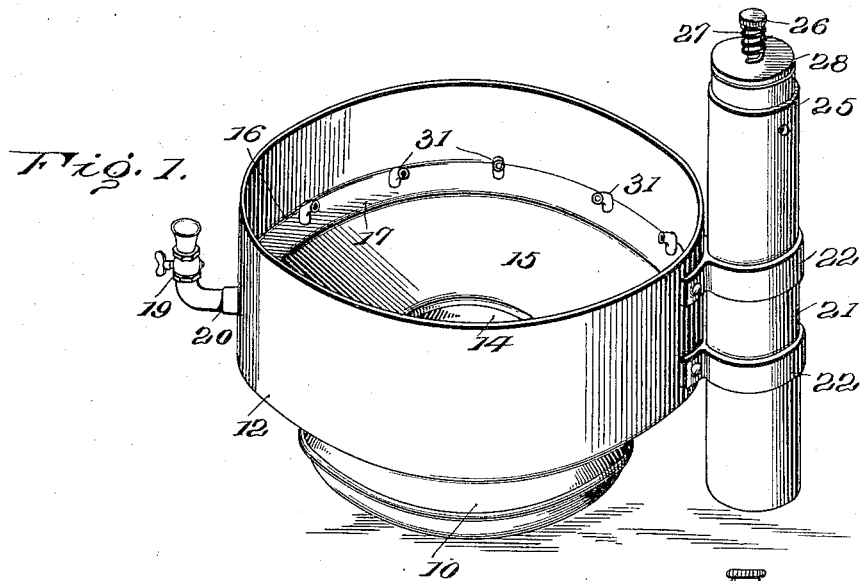
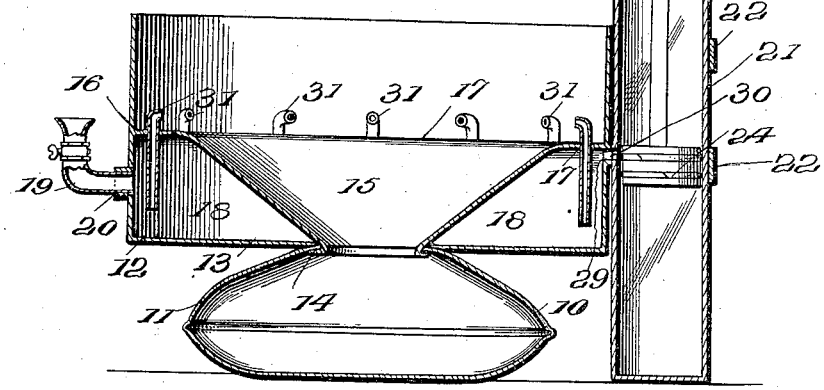
Witnesses
Inventor
Alfred Warne.
By
Attorneys.

UNITED STATES PATENT OFFICE.

ALFRED WARNE, OF MIAMI, FLORIDA.

CUSPIDOR.

1,080,090.  Specification of Letters Patent.  Patented Dec. 2, 1913.

Application filed February 7, 1913. Serial No. 746,953.

*To all whom it may concern:*

Be it known that I, ALFRED WARNE, a citizen of the United States, residing at Miami, in the county of Dade and State of Florida, have invented certain new and useful Improvements in Cuspidors, of which the following is a specification.

This invention relates to an improvement in cuspidors.

The primary object of the invention is to provide a cuspidor with means whereby the portions of the cuspidor on which the spittle lodges will be cleansed and the cuspidor kept in a sanitary condition.

A further object of the invention is to provide a construction in which the receiving portion of the cuspidor is partially hid, the portion of the cuspidor which is always in sight being cleansed by means carried by the cuspidor.

Another object of the invention is to provide a construction which may be operated to flush the receiving portion of the cuspidor without the operator lifting the receptacle from the floor or handling the same.

For a full understanding of the invention, reference is to be had to the following description and accompanying drawing, in which:—

Figure 1 is a perspective view of the device; and Fig. 2 is a transverse section.

Corresponding and like parts are referred to in the following description and indicated in all the views of the drawing by the same reference characters.

In the drawings, 10 designates a receptacle. This receptacle consists of the base portion 11, which may be of any suitable configuration, and the cylindrical member 12, the base 13 of which is connected at 14 with the receptacle 10, it being noted that the cylindrical portion may be either formed integral with the base 10 or the base provided with a threaded portion to receive a threaded extension carried by the base 13. The receptacle 10 is formed with the conical mouth portion 15 which is disposed within the cylindrical member 12 its edge portion 16 being secured to or formed integral with the inner wall of the member 12. The walls of the member 12 extend beyond the conical portion 15 of the receptacle 10, and partially conceal the conical receiving portion of the cuspidor, that is, the sloping sides are viewed only when the receptacle is tilted. The extension 17 of the conical portion 15 which is connected to or formed integral with the cylindrical member 12 is parallel with the base 13 of the cylindrical member, the connecting of the extension with the cylindrical member forming a chamber 18. Water is supplied to this chamber through an intake pipe 19 which extends within an opening 20 formed in the wall of the cylindrical member, the chamber 18 being maintained partially filled with water or a liquid disinfectant. A pump cylinder 21 is supported on the cylindrical member 12 by brackets 22, the offset terminals of said brackets being secured to the cylindrical member. The cylinder 21 receives a piston rod 23, the terminal of said rod which is disposed within the cylinder being provided with a piston head 24. A gland 25 is threaded into the open end of the cylinder 21, said gland receiving the piston rod, the terminal of which remote from the piston head 24 is provided with an enlargement 26 by means of which the rod is reciprocated. A spring 27 is coiled about said rod, one terminal of said spring contacting with the washer ring 28 which is seated within a recess formed in the gland 25, the other terminal of said spring contacting with the enlargement 26 normally maintaining the piston raised. The wall of the chamber 18 adjacent the casing 21 is provided with an aperture 29 which is in alinement with an aperture 30 formed in the casing.

When the casing is filled with water or a liquid disinfectant, and it is desired to flush the conical portion of the receptacle, the piston is reciprocated, the compressing of the air in the casing 21 forcing the water or disinfectant through tubes 31 which pass through openings formed in the extension 17, the terminal of said tubes being curved to deflect the fluid to the sloping portion 15. The water flows over the conical portion 15 of the receptacle and washes spittle which may have become lodged thereon into the receptacle, keeping the walls of the receptacle which are visible at all times thoroughly cleansed and in a sanitary condition.

Particular attention is called to the arrangement of the flushing mechanism and that the depression of the piston 23 may be accomplished by means of the foot, it requiring but a slight movement of the piston to force the liquid contained in the chamber 18 to flow over the receiving portion of the receptacle. It will be obvious that when the receptacle has become full it may be emptied and cleansed as the usual cuspidor. It will be noted also that the chamber 18 may be supplied through the tube 19 in any suitable manner, that is, the device may be used as a portable cuspidor or have a permanent connection with a supply tank.

The many advantages of a construction of this character will be clearly apparent, as it will be noted that the device may be easily and economically manufactured, and that it may be maintained in a perfectly sanitary condition at all times.

While the cylindrical member 15 is shown as formed integral with the receptacle 10, it will be noted that the device may be supported on the receptacle in any suitable manner, and that either the entire cylindrical member may be secured to the receptacle or the base 13 formed integral with the receptacle and the cylindrical portion of the member secured to the base 13. It will also be seen that the extension of the conical portion of the receptacle may be connected to the cylindrical member in any suitable manner, and that various changes may be made in the arrangement of the structure.

Having thus described my invention, what I claim as new and desire to secure by Letters Patent is:—

A cuspidor comprising a receptacle formed with an opening, a conical member formed with a flange disposed to extend within the opening of the receptacle, a cylindrical member embracing the conical member and secured to the edge of the same whereby a chamber is formed between the conical member, the cylindrical member and the receptacle, said cylindrical member being provided with an opening through which the flange portion of the conical member extends, and means for forcing fluid from the chamber to the receptacle, the fluid in its passage to the receptacle passing over the conical member.

In testimony whereof I affix my signature in presence of two witnesses.

ALFRED WARNE.

Witnesses:
JAMES T. SANDERS,
T. W. BRAMLETT.

Copies of this patent may be obtained for five cents each, by addressing the "Commissioner of Patents, Washington, D. C."